No. 722,634. PATENTED MAR. 10, 1903.
J. SCHIES.
GLASS BLOWING MACHINE.
APPLICATION FILED JUNE 9, 1902.
NO MODEL. 3 SHEETS—SHEET 1.
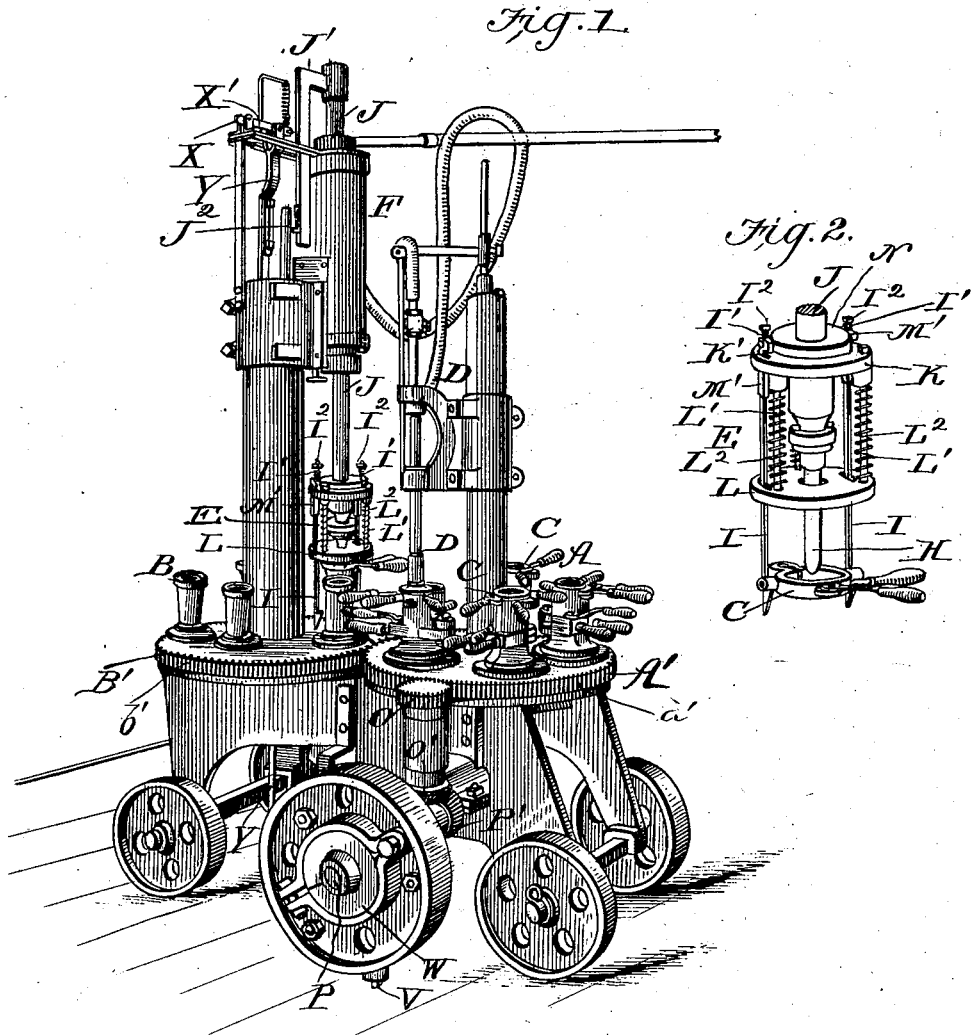
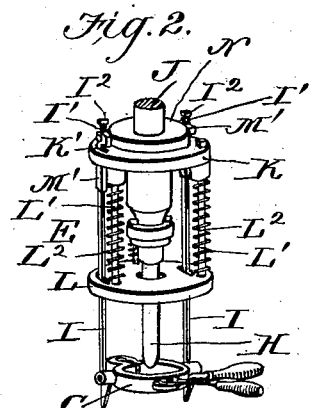
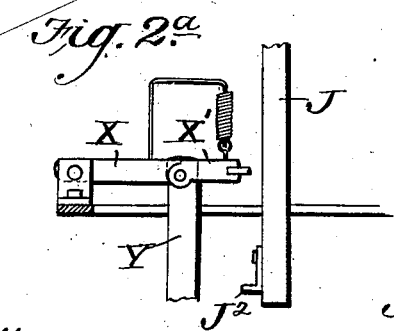
WITNESSES:
Jos. A. Ryan
Perry B. Turpin
INVENTOR
John Schies.
BY Munn & Co,
ATTORNEYS.

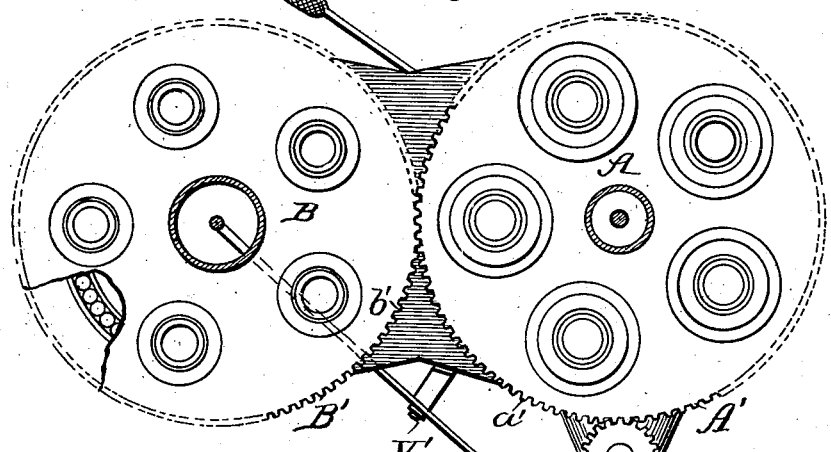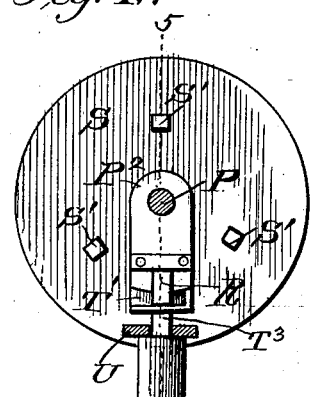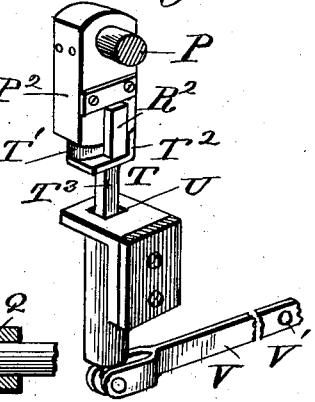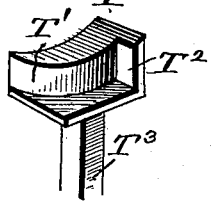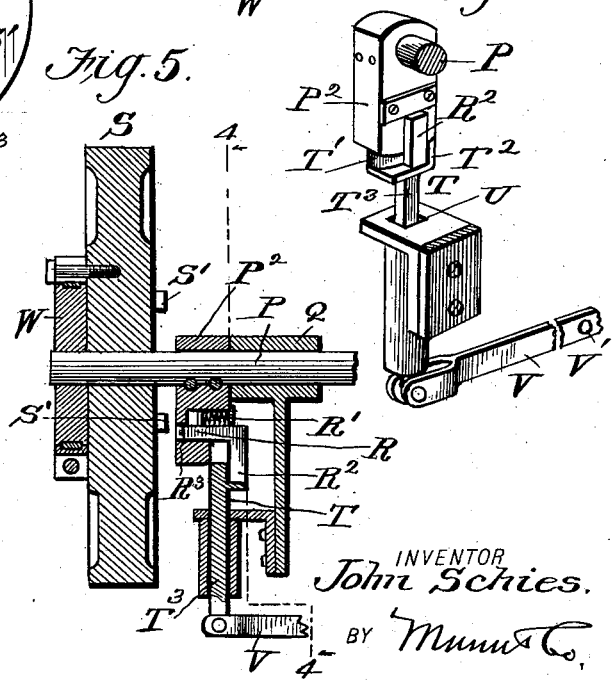

No. 722,634. PATENTED MAR. 10, 1903.
J. SCHIES.
GLASS BLOWING MACHINE.
APPLICATION FILED JUNE 9, 1902.
NO MODEL. 3 SHEETS—SHEET 3.

WITNESSES:
Jos. A. Ryan
Perry B. Turpin

INVENTOR
John Schies.
BY Munn & Co,
ATTORNEYS.

UNITED STATES PATENT OFFICE.

JOHN SCHIES, OF ANDERSON, INDIANA.

GLASS-BLOWING MACHINE.

SPECIFICATION forming part of Letters Patent No. 722,634, dated March 10, 1903.

Application filed June 9, 1902. Serial No. 110,832. (No model.)

*To all whom it may concern:*

Be it known that I, JOHN SCHIES, a citizen of the United States, residing at Anderson, in the county of Madison and State of Indiana, have made certain new and useful Improvements in Glass-Blowing Machines, of which the following is a specification.

My invention is an improvement in apparatus for use in the manufacture of glassware, such as jars, in which the mass of glass is first subjected to a pressing operation and then to a blowing operation in order to complete the same; and the invention has for an object, among others, to connect the table supporting the pressing devices with the table supporting the blowing devices, so the same may move in unison, and to provide power mechanism by which to operate the tables by power instead of by hand; and the invention consists in certain novel constructions and combinations of parts, as will be hereinafter described and claimed.

Figure 8:
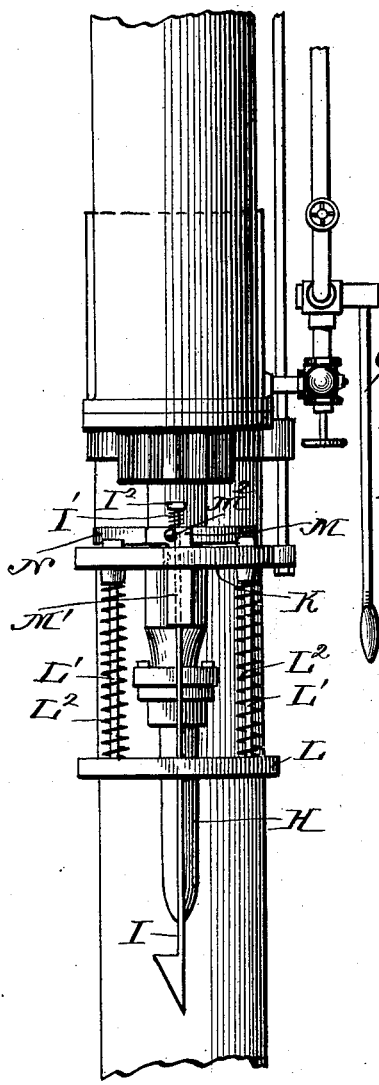
Figure 9:
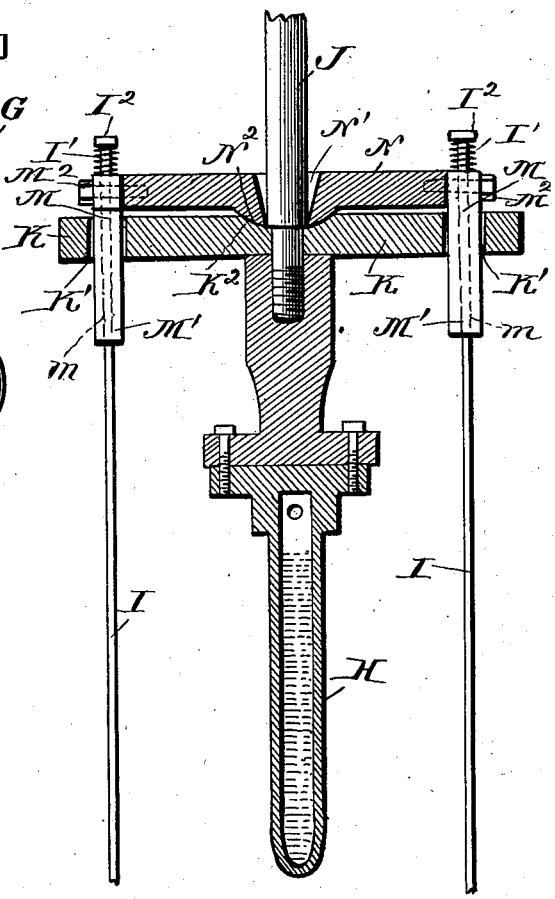

In the drawings, Figure 1 is a perspective view of an apparatus embodying my invention. Fig. 2 is a detail perspective view of the pressing-head. Fig. 2ª is a detail. Fig. 3 is a top plan view of the apparatus, parts being removed. Fig. 4 is a detail cross-section on about line 4 4 of Fig. 5. Fig. 5 is a detail section on about line 5 5 of Fig. 4. Fig. 6 is a detail perspective view of the releasing and stopping head. Fig. 7 is a detail perspective view showing such head in connection with its operating-lever and the block with which it operates. Fig. 8 is a detail side elevation, enlarged, of parts connected with the pressing-head; and Fig. 9 is a sectional view of a portion of the pressing-head, showing the main plate and the upper plate and the rocking guides for the hooks.

In carrying out my invention I support the blow-molds A on a table A' and the press-molds B on a table B', it being understood that these press-molds and blow-molds may be of any ordinary construction, so they need not be described in detail herein. The neck-mold C may also be of ordinary construction and be used in the operation of forming the glass jars in the manner well understood by glass-workers.

The tables A' and B' are connected, preferably, by providing them with peripheral gear-teeth meshing each other, as shown, so the tables will move equally and in unison. Ordinarily I provide the blow-molds and press-molds in sets of five each and construct the drive mechanism for the tables to move the said tables one-fifth of a revolution at each operation, so the press-mold table and the blow-mold table will be turned one-fifth of a revolution to facilitate the transfer of the work from the press-mold to the blow-mold in the operation of the apparatus.

In connection with the blow-table I provide a suitable blowing-head D, which may be of the ordinary construction and controlled and operated in the usual manner. Above the pressing-table I provide the pressing-head E, supported in connection with the cylinder F for operating the plunger of the pressing-head, preferably by compressed air, under the control of a lever G in the ordinary manner.

The pressing-head is of a special construction, having the head portion H, which is adapted to enter the mass of glass in the pressing-mold and press the same into shape, the hooks I for engaging the neck-mold for lifting the same, with the glass, out of the press-mold, and the supports for the said hooks, so the same can yield and also move laterally into and out of engagement with the neck-mold, as desired.

The pressing-head is carried by the rod J, which may be reciprocated in any suitable manner and to which is fixed the main plate K, from which is yieldingly supported the lower plate L by means of the slide-rods L', secured to the plate L and sliding upwardly through the main plate K and surrounded by springs L², which permit the plate L to yield upwardly when the pressing-head is lowered.

The main plate K is provided with openings K', through which are passed the depending portions M' of the guides M for the hooks I. These guides M are provided with the longitudinal openings $m$ for the hooks I and are pivoted at M² to one side of the openings to a loosely-supported plate N. The hooks I extend above the plate N and receive springs I', bearing between the upper ends of the guides M and heads or shoulders I² and cushioning said hooks when the latter are moved upward in the operation of the pressing-head, and so operating to prevent any damage to the glass as it is being lifted out of the mold.

The plate N is free to rock on the main plate K, being provided at its center with an opening N', flaring upwardly surrounding the rod J and having on its under side surrounding the opening N' a rounded boss $N^2$, fitting in a suitable socket $K^2$ in the upper side of the main plate K.

As the pressing-head is operated under the control of the lever devices in the usual manner the hooks I are moved into engagement with the neck-mold and lift said mold, with the glass, out of the press-mold when the pressing-head is raised. It will be noticed that the resilience of the hooks I, in connection with the pivoting of same to the plate N, permits the ready movement of the hooks into engagement with the neck-mold when the pressing-head is lowered.

As before suggested, I provide means whereby the tables A' and B' may be operated by drive mechanism, to which end the said tables A' and B' are provided with peripheral gear-teeth $a'$ and $b'$, meshing with each other, and a counter-shaft is provided at one end with a pinion O, meshing with the gear-teeth of one of the tables, and at its other end with a bevel-gear O', which is meshed with a bevel-gear P' on the drive-shaft P. The shaft P is supported in suitable bearings Q in connection with the framing of the machine, and on it is fixed a block $P^2$, provided with a laterally-movable tooth R, which is moved into and out of the path of a projection S' on a wheel S, the latter being mounted loosely on the shaft P and geared to continually revolve usually by means of a belt-gearing, as will be understood. This pulley S has projections S', one or more, as may be desired, extending laterally from its inner side, and the tooth R is movable into and out of the path of these projections. This tooth R is movable laterally in an opening $R^3$, formed in the block $P^2$, and is engaged by a spring R', which operates to actuate the tooth R into the path of the projection S'. To free the tooth R from engagement with the projection S' and to hold said tooth R clear of such engagement, except when desired, I provide the tooth R, preferably at its inner end, with an outwardly-extending projection or arm $R^2$, which engages with a releasing and stop head T when the latter is in its innermost position. This head T has a cam-surface T', which frees the tooth from the projection S', and a stop-shoulder $T^2$, which stops the tooth R and with it the block $P^2$ when the parts are in the position shown in Fig. 7, in which the head T is shown in its innermost position. The head T has a shank $T^3$, movable longitudinally in a guide U, supported by the framing, and a lever V is arranged for operation whereby to move the head T into and out of the path of the arm $R^2$ of the tooth R. In operation the wheel S turning continually does not operate upon the shaft P unless the lever V be operated to move the head T clear of the arm $R^2$ of the tooth R. At such time the spring R' will force the tooth R laterally toward the wheel S into the path of the projection S', and the wheel S will then carry the block $P^2$ and with it the shaft P until the arm $R^2$ again engages with the head T, when the tooth R will be freed from the projection S' and the shaft P will stop. It will be understood that the lever V is operated to release the head T from the arm $R^2$ and then again released, so the head T will adjust back into position for engagement by the projection S'. By this means the operator may secure a single revolution of the wheel O to effect a partial revolution of the two tables A' and B' in use. The wheel S is provided with a friction-wheel W (see Figs. 1 and 5) to relieve the shock when the projection S' engages the tooth R. In operation the block as it strikes the stop-shoulder $T^2$ will have a tendency to slightly rebound from the shock. The friction-wheel W, carried by the drive-wheel, will bind upon the drive-shaft P with sufficient force to bring the tooth snugly up against the stop-shoulder of the head T, after which such friction-wheel W will slip upon the drive-shaft P until the operation is repeated.

The lever V is pivoted at V' between its ends and may be operated directly by the operator; but it is preferred to operate this lever automatically from the piston-rod J of the press-head. To this end such piston-rod J extends above its cylinder and is provided with an arm J', carrying a pin $J^2$, which operates beneath a jointed section X' of a lever X, which lever is connected by a rod Y with the lever V, so it will operate such lever V automatically as the pressing-head moves upward.

The lever V may be operated by hand to adjust the head T out of the path of the arm R, or such lever V may be automatically operated by the piston-rod J of the press-head, as before described. The purpose of jointing the lever X between its ends is to permit the projection $J^2$ to move downwardly past the end of said lever without depressing the rod Y. The upward movement of the projection $J^2$ operates to lift the lever X and said rod Y, as will be understood from Fig. $2^a$. Thus the upward movement of the piston-rod will lower the head T and release the arm $R^2$, so the arm $R^3$ will adjust into the path of the projection S', the lever X being immediately released, so the head T will readjust and the arm $R^2$ will ride upon the surface T' of such head and draw the arm $R^3$ out of engagement with the projection S'. On the downward movement of the rod J the projection $J^2$ slips by the end of the jointed lever X without operating such lever.

Having thus described my invention, what I claim as new, and desire to secure by Letters Patent, is—

1. A glass-machine comprising the press-molds, the blow-molds, the pressing devices and blowing devices coöperating with the press-molds and blow-molds, the tables supporting the press-molds and blow-molds and having the peripheral teeth meshing with each other, the counter-shaft geared with the teeth of one of the tables, a drive-shaft geared with the counter-shaft, a block fixed on the drive-shaft and having a laterally-movable tooth and a spring for actuating said tooth in one direction, a drive-wheel loose on the shaft and having a projection for engagement with the tooth of the block, a releasing and stop head for said tooth having a cam-surface to release the tooth from engagement with the projection on the drive-wheel, and a shoulder for stopping said tooth and its block, said head being movable into and out of position for engagement with the tooth, and means for operating the head, substantially as set forth.

2. The combination in a glass-machine with the drive mechanism, of the throw-off mechanism, the press-head mechanism, and the intermediate devices connected with the throw-off mechanism and having a portion projecting into the path of the press-head mechanism whereby the throw-off mechanism may be positively operated by the movement of the press-head substantially as set forth.

3. The combination with the drive mechanism, the throw-off mechanism, and the press-head having the plunger provided with a lateral projection, of intermediate devices connected with the throw-off mechanism, and the jointed lever in connection with said devices and arranged for operation by the lateral projection of the press-head plunger substantially as set forth.

4. In an apparatus substantially as described, a pressing-head having a main plate, an upper plate rockably supported above the main plate, the hooks, the guides for said hooks pivoted to the upper plate and extending through the main plate and having guide-openings for the hooks, the hooks extending above the said guide, and the cushioning-springs operating upon the hooks above the guides, substantially as set forth.

5. The combination in a pressing-head for glass-machines, of the main plate, the upper plate above the main plate, the guides for the hooks pivoted to the upper plate, the hooks extending through said guides and the cushioning-springs operating on the hooks above their guides, substantially as set forth.

6. The combination in a pressing-head for glass-machines, of the main plate provided in its upper side with a rounded socket, the upper plate having on its under side a rounded boss operating in said socket, the hook-guides pivoted to the upper plate and having openings for the hooks, the hooks extending through said openings in the guides, and the cushioning-springs operating between the hooks and the guides, substantially as set forth.

7. The combination in a glass-machine, with the hooks, and a plate for supporting the same, of guides pivoted to the said plate and having openings for the hooks, and springs operating between the hooks and the guides, substantially as set forth.

8. A glass-machine comprising the tables supporting the molds and geared together, a drive-shaft, gearing between the drive-shaft and one of the tables, a block fixed on the shaft and having a laterally-movable tooth, a drive-wheel having a projection for engagement with the tooth of the block, a releasing and stop head for said tooth and a lever connected with said stop-head by which it can be operated, substantially as set forth.

JOHN SCHIES.

Witnesses:
SOLON C. KEMON,
PERRY B. TURPIN.